(12) United States Patent
Nakagawa

(10) Patent No.: US 12,358,601 B2
(45) Date of Patent: Jul. 15, 2025

(54) COOLING SYSTEM FOR WATERCRAFT

(71) Applicant: HONDA MOTOR CO., LTD., Tokyo (JP)

(72) Inventor: Yoshiya Nakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 373 days.

(21) Appl. No.: 18/159,397

(22) Filed: Jan. 25, 2023

(65) Prior Publication Data
US 2023/0242230 A1 Aug. 3, 2023

(30) Foreign Application Priority Data
Jan. 31, 2022 (JP) ................... 2022-013196

(51) Int. Cl.
| | | |
|---|---|---|
| B63H 21/38 | (2006.01) | |
| B60L 50/60 | (2019.01) | |
| B63H 21/17 | (2006.01) | |
| F01P 3/20 | (2006.01) | |
| F01P 7/16 | (2006.01) | |

(52) U.S. Cl.
CPC .............. B63H 21/17 (2013.01); B60L 50/60 (2019.02); B63H 21/383 (2013.01); F01P 3/207 (2013.01); F01P 7/165 (2013.01)

(58) Field of Classification Search
CPC ...... B63H 21/17; B63H 21/383; B63H 21/38; B60L 50/60; B60L 1/02; B60L 2200/32; B60L 58/26; B63J 2/12; Y02T 10/70; F01P 3/202; F01P 3/207
See application file for complete search history.

(56) References Cited

U.S. PATENT DOCUMENTS

| | | | | |
|---|---|---|---|---|
| 7,789,176 | B2* | 9/2010 | Zhou ................... | B60H 1/00885 |
| | | | | 180/65.1 |
| 8,137,146 | B2* | 3/2012 | Cohen ................ | F01P 7/16 |
| | | | | 440/88 HE |
| 8,864,538 | B1* | 10/2014 | Arbuckle ............ | B63H 21/383 |
| | | | | 440/88 P |
| 2024/0141821 | A1* | 5/2024 | Miyake ............... | F01P 5/12 |

FOREIGN PATENT DOCUMENTS

| | | | | |
|---|---|---|---|---|
| CN | 112049716 A | * | 12/2020 | ............ F01D 15/10 |
| EP | 4286269 A1 | | 12/2023 | |
| JP | 2014239607 A | | 12/2014 | |
| WO | WO-2010002267 A1 | * | 1/2010 | ............ B63H 21/10 |

OTHER PUBLICATIONS

Office Action for German Patent Application No. 102023101984.8 dated Jun. 28, 2024; 7 pp.
Search Report for German Patent Application No. 102023101984.8 issued Jun. 27, 2024; 10 pp.

* cited by examiner

*Primary Examiner* — Andrew Polay
(74) *Attorney, Agent, or Firm* — Armstrong Teasdale LLP

(57) ABSTRACT

A watercraft battery cooling system 1 comprises: a coolant channel 12 through which coolant circulates to cool a battery 5; a cooling water channel 13 through which cooling water flows; and a heat exchanger 14 for exchanging heat between the coolant and the cooling water. The cooling water channel 13 includes a tank 21. The cooling system is configured such that, when a watercraft equipped with the system is on-water, the water can be stored in the tank 21, and that, when the watercraft is on land during battery charging, the water stored in the tank 21 can be used to circulate through the cooling water channel 13 as cooling water.

6 Claims, 5 Drawing Sheets

COOLING SYSTEM FOR WATERCRAFT

TECHNICAL FIELD

The present invention relates to a cooling system for watercraft for use in a watercraft equipped with an electric propulsion device and a battery for powering the electric propulsion device, and wherein the system cools the battery during battery charging.

BACKGROUND ART

In recent years, it has been desirable to introduce electric-powered watercrafts, in particular, small-size ones, in order to reduce the adverse impact of exhaust gas emission on the global environment. During battery charging, batteries used in watercrafts generally produce heat and some require battery cooling. An example of battery cooling technologies is taught in Patent Document 1, in which tap water is used as cooling water for battery cooling, and the cooling water is discharged into the outside such as the sea.

PRIOR ART DOCUMENT(S)

Patent Document(s)

Patent Document 1: JP2014-239607A

SUMMARY OF THE INVENTION

Task to be Accomplished by the Invention

However, the method described in Patent Document 1 requires a large amount of tap water each time the battery is charged, resulting in an increase in the operational cost of watercraft.

Furthermore, the method disclosed in Patent Document 1 is based on the premise that the battery is charged while a watercraft is floating on the water. However, when there is no charging station in a mooring facility, a watercraft needs to be landed for battery charging. Examples of methods for cooling batteries of watercrafts during on land include a method including exchanging heat with air using a radiator or any other air heat exchanger, and a method including exchanging heat with refrigerant using a chiller system. However, environment in which such a radiator is disposed can become hotter than the heated battery, which causes difficulty in effective battery cooling. Such a chiller system requires a higher cost to be placed in a watercraft and can worsen inboard layout flexibility.

The present invention has been made in view of the above-described problems of the prior art, and a primary object of the present invention is to provide a cooling system for watercraft which can be used for battery cooling in an electric-powered watercraft when the watercraft is on land, and easily introduced and operated in the watercraft with a relatively low cost.

Means to Accomplish the Task

An aspect of the present invention made to accomplish the above described task provides a cooling system for watercraft comprising: a rechargeable battery (5) capable of powering an electric propulsion device (4) of a watercraft (2); a coolant channel (12) through which coolant circulates to cool the battery (5); a cooling water channel (13) through which cooling water flows, the cooling water containing seawater or fresh water acquired from outside sources; and a heat exchanger (14) for exchanging heat between a primary channel (28) and a secondary channel (29), wherein the primary channel (28) communicates with the coolant channel (12) and allows the coolant to flow therethrough, and wherein the secondary channel (29) communicates with the cooling water channel (13) and allows the cooling water to flow therethrough, wherein the cooling water channel (13) comprises: a central water line which communicates with the secondary channel (29), and includes a water inlet (18) for taking in the cooling water, a water outlet (19) for discharging the cooling water, and a tank (21) for storing the cooling water; a first bypass channel (22) which communicates with the central water line so as to cause the flow of the cooling water to bypass the water inlet (18) and the water outlet (19), thereby allowing the cooling water stored in the tank (21) to circulate in the cooling water channel (13), and a first bypass valve arrangement (24, 25) which enables a selection of whether or not the cooling water is allowed to flow through the first bypass channel (22).

According to this configuration, water can be stored in the tank prior to use, and the stored water can be used as cooling water that circulates through a cooling water channel Thus, the cooling system for watercraft can cool batteries during charging with low cost, even when a watercraft is on land where free water cannot be easily available. Moreover, the cooling system for watercraft of this configuration can be introduced in a watercraft with a relatively low cost compared to a chiller system.

The cooling system may be further configured such that the first bypass valve arrangement (24, 25) comprises: a first open-close valve (24) provided in the central water line between the water inlet (18) and a location where one end of the first bypass channel (22), the end being on the side of the water inlet, is communicatively connected to the central water line, wherein the first open-close valve (24) is configured to open and close, thereby allowing and preventing the flow of the cooling water in the central water line; and a first channel switch valve (25) provided at a location where the other end of the first bypass channel (22), the end being on the side of the water outlet, is communicatively connected to the central water line, wherein the first channel switch valve (25) is configured to switchably direct the flow of the cooling water in the central water line between toward the water outlet (19), and into the first bypass channel (22).

In this configuration, the cooling system can switch between a flow line through which the cooling water in the tank circulates within the system, and a flow line through which the cooling water taken from the outside flows in the system to be discharged to the outside, despite a relatively simple configuration.

The cooling system may be further configured such that the cooling water channel (13) comprises: a second bypass channel (23) which communicates with the central water line so as to cause the flow of the cooling water to bypass the tank (21); and a second bypass valve arrangement (26, 27) which enables a selection of whether or not the cooling water is allowed to flow through the second bypass channel (23).

In this configuration, when the water in the tank is not used, the cooling water can be directed to and flow through the second bypass channel that bypasses the tank, which reduces the energy required for a pump for cooling water.

The cooling system may be further configured such that the second bypass valve arrangement (26, 27) comprises: a second channel switch valve (26) provided at a location where one end of the second bypass channel (23) is communicatively connected to the central water line, the location being upstream of the tank in the central water line, wherein the second channel switch valve (26) is configured to switchably direct the flow of the cooling water in the central water line between toward the tank (21), and into the second bypass channel (23); and a second open-close valve (27) provided in the central water line between the tank (21) and a location, the location being downstream of the tank, where the other end of the second bypass channel (23) is communicatively connected to the central water line, wherein the second open-close valve (27) is configured to open and close, thereby allowing and preventing the flow of the cooling water in the central water line.

In this configuration, the cooling system can easily switch between a flow line in which the cooling water channel passes through the tank and a flow line in which the cooling water channel bypasses the tank.

The cooling system may be further configured such that the cooling system further comprises: a land-water determination device (6) configured to determine whether the watercraft (2) is on water or on land; a movement detection device (7) configured to determine whether or not the watercraft (2) is moving; a charge detection device (8) configured to determine whether or not the battery (5) is being charged; a control device (9) configured to receive information from the land-water determination device (6), the movement detection device (7), and the charge detection device (8) and control the first and second bypass valve arrangements (24 to 27), wherein the control device (9) controls the first and second bypass valve arrangements (24 to 27) such that, when the battery (5) is charged on land, the cooling water flows through the first bypass channel (22) and does not flow through the second bypass channel (23), and that, when the battery (5) is charged on water and the watercraft (2) is moving on water, the cooling water does not flow through the first bypass channel (22) and flows through the second bypass channel (23).

In this configuration, the control device opens and closes each valve properly according to the state of the watercraft, the cooling system becomes more convenient for users.

The cooling system may be further configured such that the tank (21) is provided with a water injection port (30) through which the cooling water can be injected in the tank (21).

In this configuration, water such as tap water can be injected into the tank via the water injection port. Thus, when the watercraft is on land and the cooling water is heated to a high temperature, water can be added to the cooling water in the cooling system to thereby lower the temperature of the cooling water.

Effect of the Invention

As described above, the present invention can provide a cooling system for watercraft which can be used for battery cooling in an electric-powered watercraft when the watercraft is on land, and easily introduced and operated in the watercraft with a relatively low cost.

DESCRIPTION OF THE PREFERRED EMBODIMENT(S)

A cooling system for watercraft (herein also written as "watercraft battery cooling system") of an embodiment of the present invention will be described below with reference to the drawings.

Figure 1:
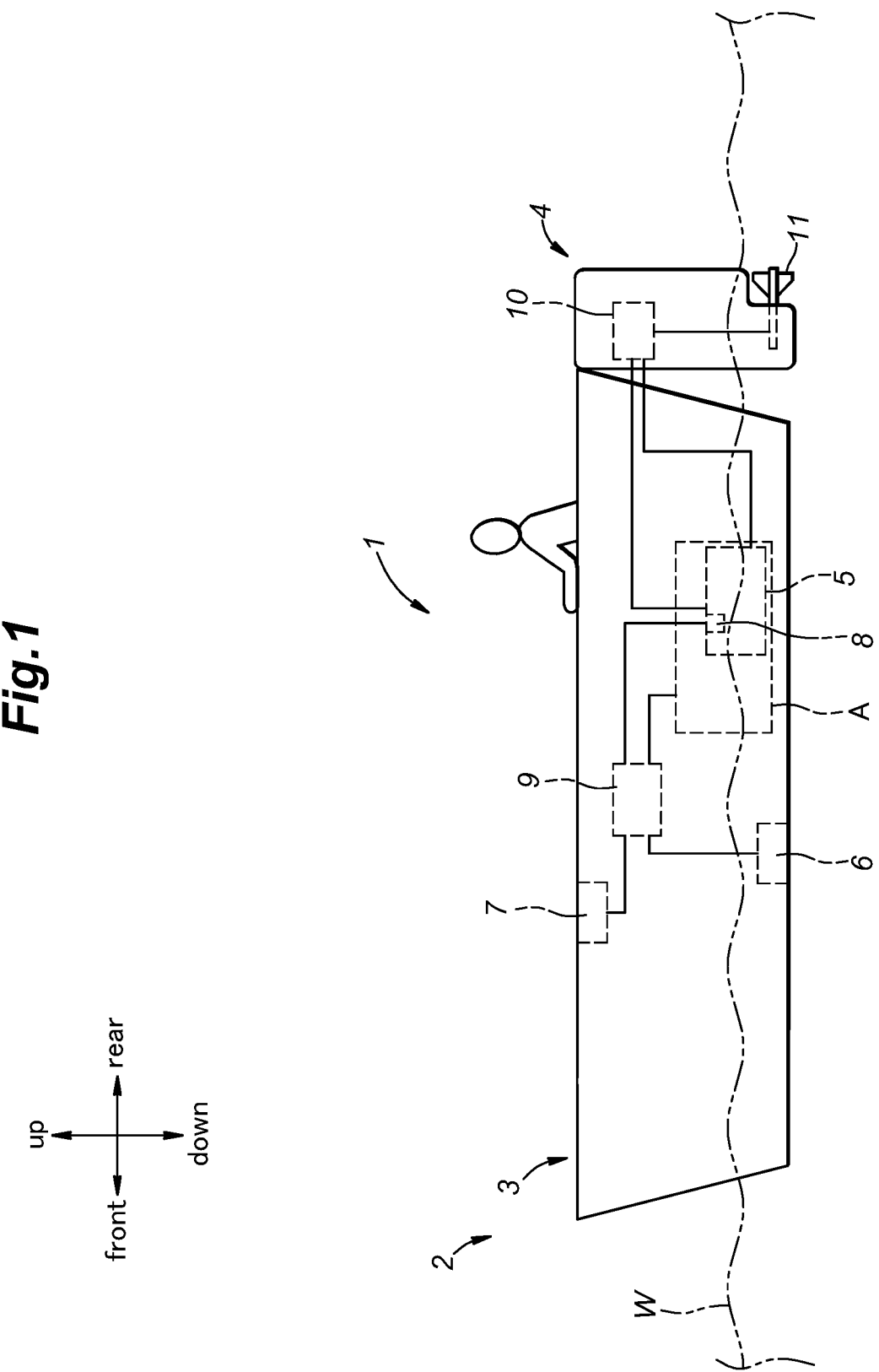
FIG. 1 is a schematic side view of a watercraft equipped with a cooling system for watercraft according to an embodiment of the present invention.

FIG. 1 shows a watercraft 2 equipped with a watercraft battery cooling system 1 according to an embodiment of the present invention. The type of the watercraft 2 is not limited to, but preferably a small-size watercraft such as a pleasure boat. The watercraft 2 comprises: a watercraft body (hull) 3 that extends in the front-rear direction and forms the body of the watercraft 2; an electric propulsion device 4 attached to the rear of the watercraft body 3; a battery 5 mounted in the watercraft body 3 for supplying electric power to the electric propulsion device 4; a land-water determination device 6 configured to detect whether the watercraft 2 is on water or on land; a movement detection device 7 configured to determine whether or not the watercraft is moving; a charge detection device 8 configured to determine whether or not the battery 5 is being charged; and a control device 9 configured to receive information from the land-water determination device 6, the movement detection device 7, and the charge detection device 8.

The electric propulsion device 4 is an outboard motor detachably attached to the watercraft body 3, and includes an electric motor 10 as a driving power source; a propeller 11 located below the waterline W and rotated by the driving force of the electric motor 10 to provide the watercraft 2 with propulsion. In other cases, the electric propulsion device 4 may be an inboard motor or an inboard/outboard motor that is fixed to the watercraft body 3 such that the device is not detachable from the watercraft body.

The battery 5 is fixed to or detachably attached to the watercraft body 3 and electrically connected to the electric motor 10. The battery 5 is a battery that can be charged by external power, such as a lithium-ion battery or a lead storage battery.

The land-water determination device 6 may be, for example, a water pressure sensor installed on the outer surface of the bottom of the watercraft body 3. The movement detection device 7 may be, for example, a speedometer configured to determine the speed of the watercraft 2 based on GPS signals or signals from the water pressure sensor. The charge detection device 8 may be, for example, a voltmeter for measuring the voltage of the battery 5.

The control device 9 is configured to receive information from the land-water determination device 6, movement detection device 7 and charge detection device 8, and performs predetermined processing operations based on the received information. The control device 9 is an electronic control unit (ECU) including a CPU, a nonvolatile memory (ROM), a volatile memory (RAM), and other components. In the control device 9, the CPU executes processing operations according to software programs. The control device 9 may be configured as one piece of hardware, or a unit formed by two or more pieces of hardware. Each functional unit of the control device 9 may be at least partially implemented by a hardware component such as LSI, ASIC, or FPGA, and/or a combination of software programs and hardware components.

Figure 2:
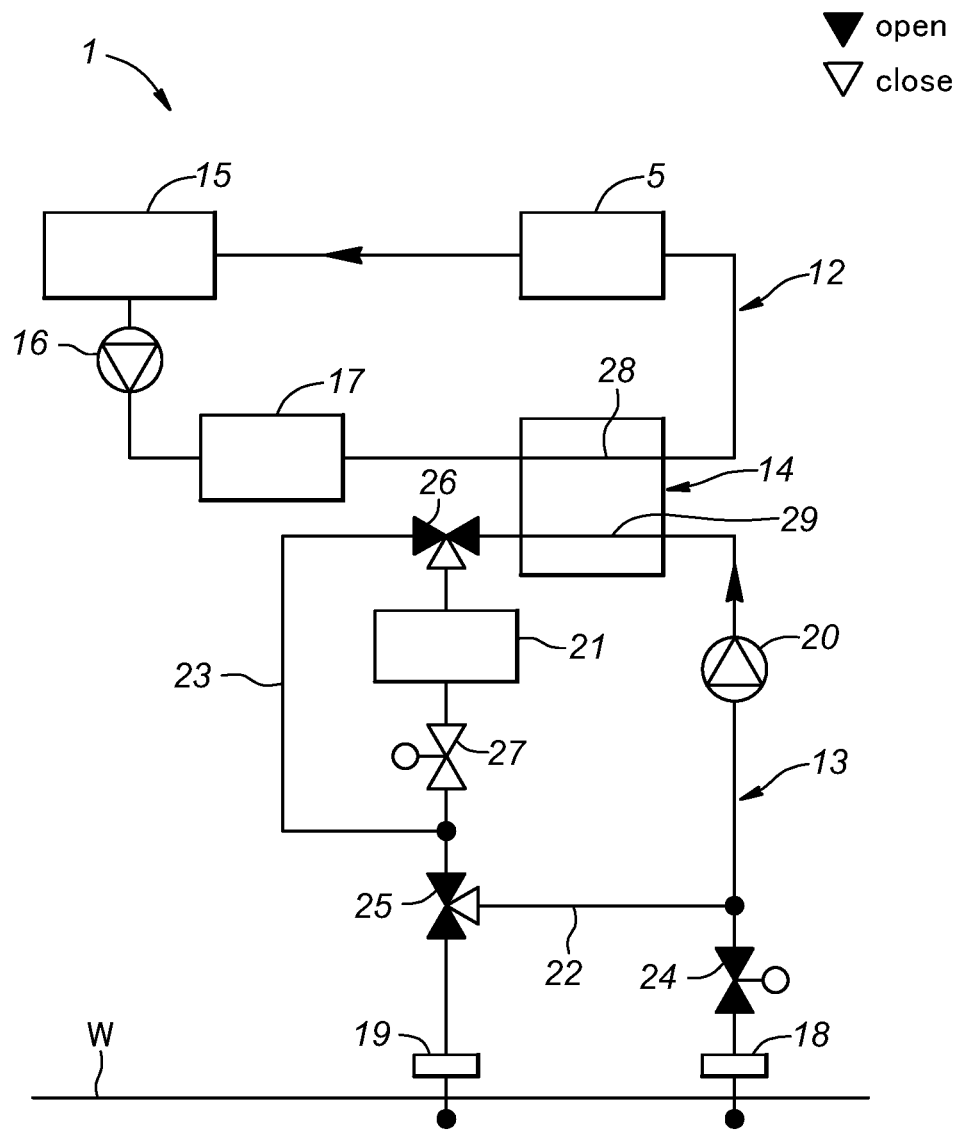
FIG. 2 is a schematic diagram showing part of the cooling system according to the embodiment (when the watercraft is moving on water and the battery is being charged on water)

FIG. 2 is a schematic diagram showing part of the watercraft battery cooling system 1 (the part indicated by A in FIG. 1). The watercraft battery cooling system 1, as shown in FIG. 2, includes: the battery 5; a coolant channel 12 through which coolant circulates in order to cool the battery 5; a cooling water channel 13 through which cooling water flows, the cooling water containing seawater or fresh water acquired from the outside; and a heat exchanger 14 for exchanging heat between the coolant and the cooling water. As shown in FIG. 1, the watercraft battery cooling system 1 also comprises the land-water determination device 6, the movement detection device 7, the charge detection device 8 and the control device 9.

As shown in FIG. 2, the coolant channel 12 includes a coolant tank 15 for storing coolant, a coolant pump 16 for moving the coolant within the coolant channel 12, and a converter 17 for high voltage charging.

The cooling water channel 13 includes a water inlet 18 for taking in cooling water from the outside; a water outlet 19 for discharging cooling water to the outside; a cooling water pump 20 for moving cooling water to the cooling water channel 13; a tank 21 provided in the watercraft body 3 to store cooling water; a first bypass channel 22 which causes the flow of the cooling water to bypass the water inlet 18 and the water outlet 19; and a second bypass channel 23 which causes the flow of the cooling water to bypass the tank 21. The cooling water pump 20 and the heat exchanger 14 are communicatively connected to the cooling water channel 13 at locations which are not in the first and second bypass channels 22 and 23 and which cannot be bypassed by the first and second bypass channels 22 and 23. Hereafter, a term "central water line" refers to a flow line of the cooling water extending from the water inlet 18 to the water outlet 19 with passing through the cooling water pump 20 and the tank 21, without passing through the first and second bypass channels 22, 23. The watercraft battery cooling system 1 can take in cooling water (seawater or fresh water) from the outside area where the watercraft 2 is floating, such as sea, lake or river, through the water inlet 18. The water inlet 18 is preferably provided with a filtering device such as mesh material.

The cooling water channel 13 includes: a first open-close valve 24 provided in the central water line between the water inlet 18 and a location where one end of the first bypass channel 22, the end being on the side of the water inlet 18, is communicatively connected to the central water line, and wherein the first open-close valve 24 is configured to open and close, thereby allowing and preventing the flow of the cooling water in the central water line; and a first channel switch valve 25 provided at a location where the other end of the first bypass channel 22, the end being one the side of the water outlet 19, is communicatively connected to the central water line, wherein the first channel switch valve 25 is configured to switchably direct the flow of the cooling water in the central water line between toward the water outlet 19, and into the first bypass channel 22. A first bypass valve arrangement includes the first open-close valve 24 and the first channel switch valve 25, and enables a selection of whether or not the cooling water is allowed to flow through the first bypass channel 22.

The cooling water channel 13 includes: a second channel switch valve 26 provided at a location where one end of the second bypass channel 23 is communicatively connected to the central water line, the location being upstream of the tank 21 in the central water line, wherein the second channel switch valve 26 is configured to switchably direct the flow of the cooling water in the central water line between toward the tank 21, and into the second bypass channel 23; and a second open-close valve 27 provided in the central water line between the tank 21 and a location, the location being downstream of the tank 21, where the other end of the second bypass channel 23 is communicatively connected to the central water line, wherein the second open-close valve 27 is configured to open and close, thereby allowing and preventing the flow of the cooling water in the central water line. A second bypass valve arrangement includes the second channel switch valve 26 and the second open-close valve 27, and enables a selection of whether or not the cooling water is allowed to flow through the first bypass channel 22.

The heat exchanger 14 includes: a primary channel 28 which communicates with the coolant channel 12 and allows the coolant to flow therethrough; and a secondary channel 29 which communicates with the cooling water channel 13 and allows cooling water to flow therethrough. The heat exchanger 14 is configured to exchange heat between the primary channel 28 and the secondary channel 29.

The tank 21 may be provided exclusively for cooling water, or may be a ballast tank that is also used as the tank of the system. Preferably, the tank 21 is configured to receive cooling water from its upper part and discharge the cooling water from its lower part.

Figure 3:
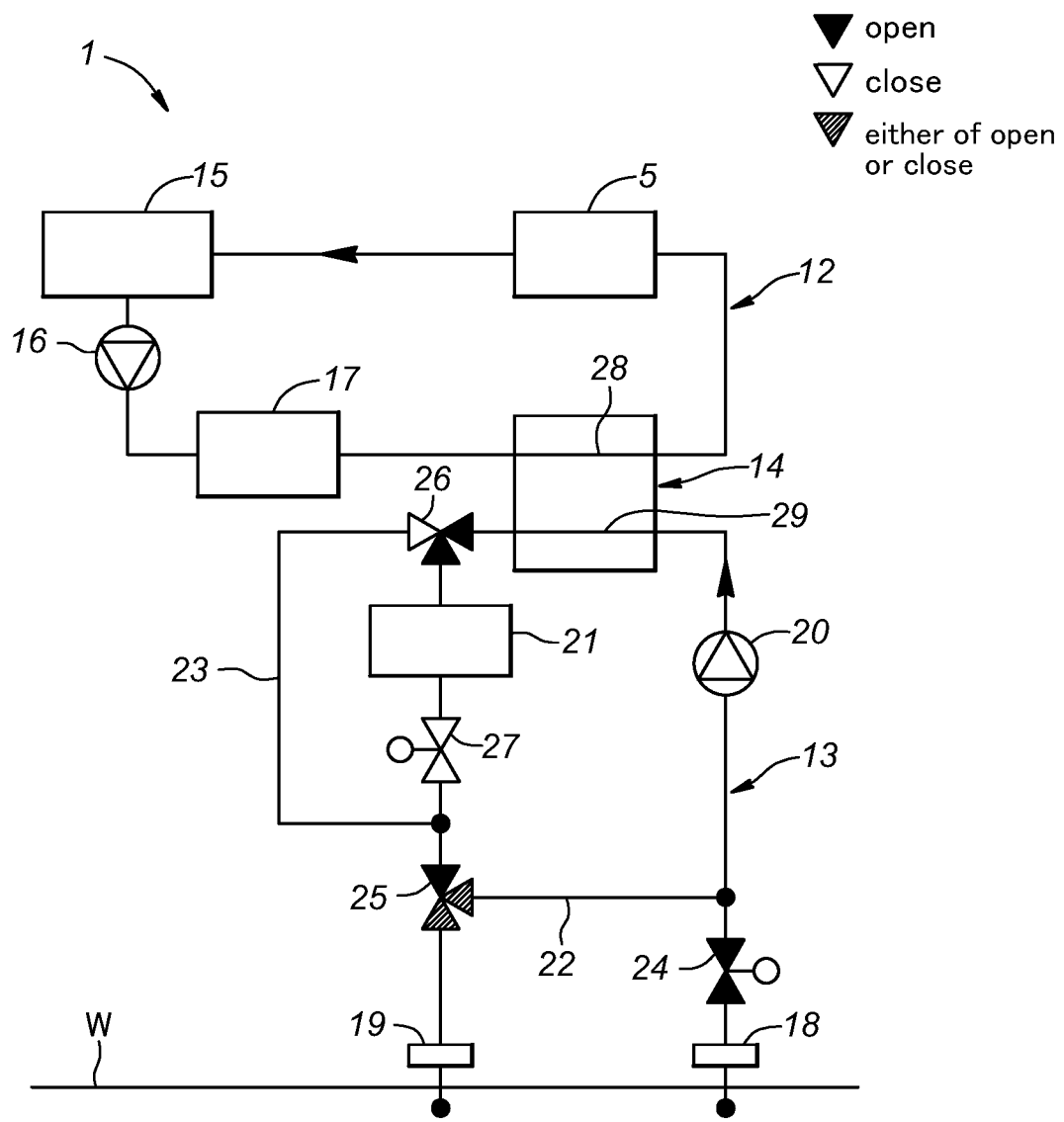
FIG. 3 is a schematic diagram showing part of the cooling system according to the embodiment (when the cooling water is being stored)
Figure 4:
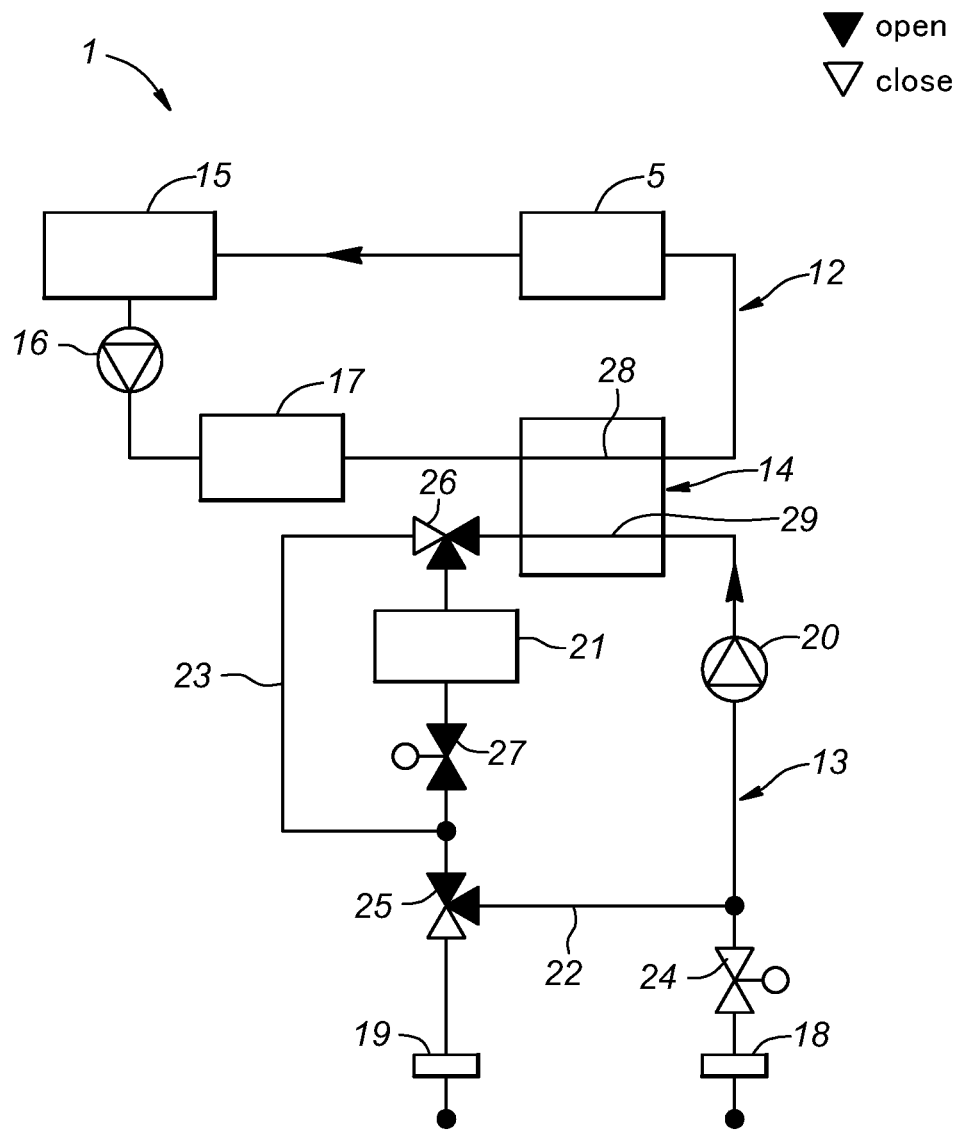
FIG. 4 is a schematic diagram showing part of the cooling system according to the embodiment (when the battery is being charged and the watercraft is on land)

FIGS. 2 to 4 show respective open/close states of the valves 24 to 27, the states of the valves being different from each other. The opening and closing of each of the valves 24 to 27 is controlled by the control device 9 (see FIG. 1). The control device 9 opens or closes the valves 24 to 27 based on information from the land-water determination device 6, movement detection device 7 and charge detection device 8 and/or instructions entered by a user. When the control device 9 opens and closes the valves 24 to 27 based on instructions entered by a user, the user needs to designate an operation to be performed among some possible operations, such as charging on land, charging or moving on water, and storing water. Based on the user's designation, the control device 9 opens and closes the valves 24 to 27 for the designated operation.

In any of the states shown in FIGS. 2 to 4, the coolant is cooled by the heat exchanger 14 and circulates through a circulation flow line formed by the coolant channel 12 and the primary channel 28 to thereby cool the battery 5.

FIG. 2 shows the states of the valves when the watercraft battery cooling system 1 cools the battery 5 while the watercraft 2 (see FIG. 1) is moving on water, i.e., the battery 5 is supplying power to the electric motor 10 (see FIG. 1), or when the watercraft battery cooling system 1 cools the battery 5 that is being charged while the watercraft 2 is on the water. In these cases, the water from the outside area where the watercraft 2 is floating (e.g. sea, lake or river) can be used. The cooling water can be taken from the water inlet 18, flows through the cooling water pump 20, the heat exchanger 14 and the second bypass channel 23, and is discharged from the water outlet 19. Thus, the first open-close valve 24 is opened and the first channel switch valve 25 is opened toward the water outlet 19 while the second channel switch valve 26 is opened toward the second bypass channel 23 and the second open-close valve 27 is closed.

FIG. 3 shows the states of the valves when the watercraft battery cooling system 1 is storing water in the tank 21 as the cooling water, the water being taken from the outside area where the watercraft 2 is floating (e.g. sea, lake or river), while the watercraft 2 (see FIG. 1) is on water. The cooling water is taken in from a water inlet 18, flows through the cooling water pump 20 and the heat exchanger 14, and is stored in the tank 21. Thus, the first open-close valve 24 is opened, the second channel switch valve 26 is opened toward the tank 21, and the second open-close valve 27 is closed so that the cooling water in the tank 21 does not flow out. In this case, since the cooling water does not flow through the first channel switch valve 25, the first channel switch valve 25 may be opened toward either of the water outlet 19 or the first bypass channel 22. Although not shown, when the cooling water is discharged from the tank 21, the watercraft battery cooling system 1 stops the cooling water pump 20, opens the second open-close valve 27, and opens the first channel switch valve 25 toward the water outlet 19. The watercraft battery cooling system 1 may be configured such that, after the cooling water in the tank 21 is drained, new cooling water is into the tank 21 as shown in FIG. 3. Furthermore, the states of the valves 24 to 27 shown in FIG. 3 may be changed so that the second open-close valve 27 is opened and the first channel switch valve 25 is opened toward the water outlet 19, thereby enabling the introduction of additional cooling water into the tank 21 concurrently with discharging the cooling water from the tank 21.

FIG. 4 shows the states of the valves when the watercraft battery cooling system 1 is cooling the battery 5 when the battery is being charged and the watercraft 2 (see FIG. 1) is on land. In this case, the watercraft battery cooling system 1 uses the water stored in the tank 21 as cooling water because the system cannot take new water from the outside water sources such as sea, lakes, or rivers. In this case, the cooling water flowing out from the tank 21 returns to the tank 21 through the first bypass channel 22, the cooling water pump 20 and the heat exchanger 14. Thus, the second open-close valve 27 is opened and the first channel switch valve 25 is opened toward the first bypass channel 22, while the first open-close valve 24 is closed and the second channel switch valve 26 is opened toward the tank 21.

Figure 5:
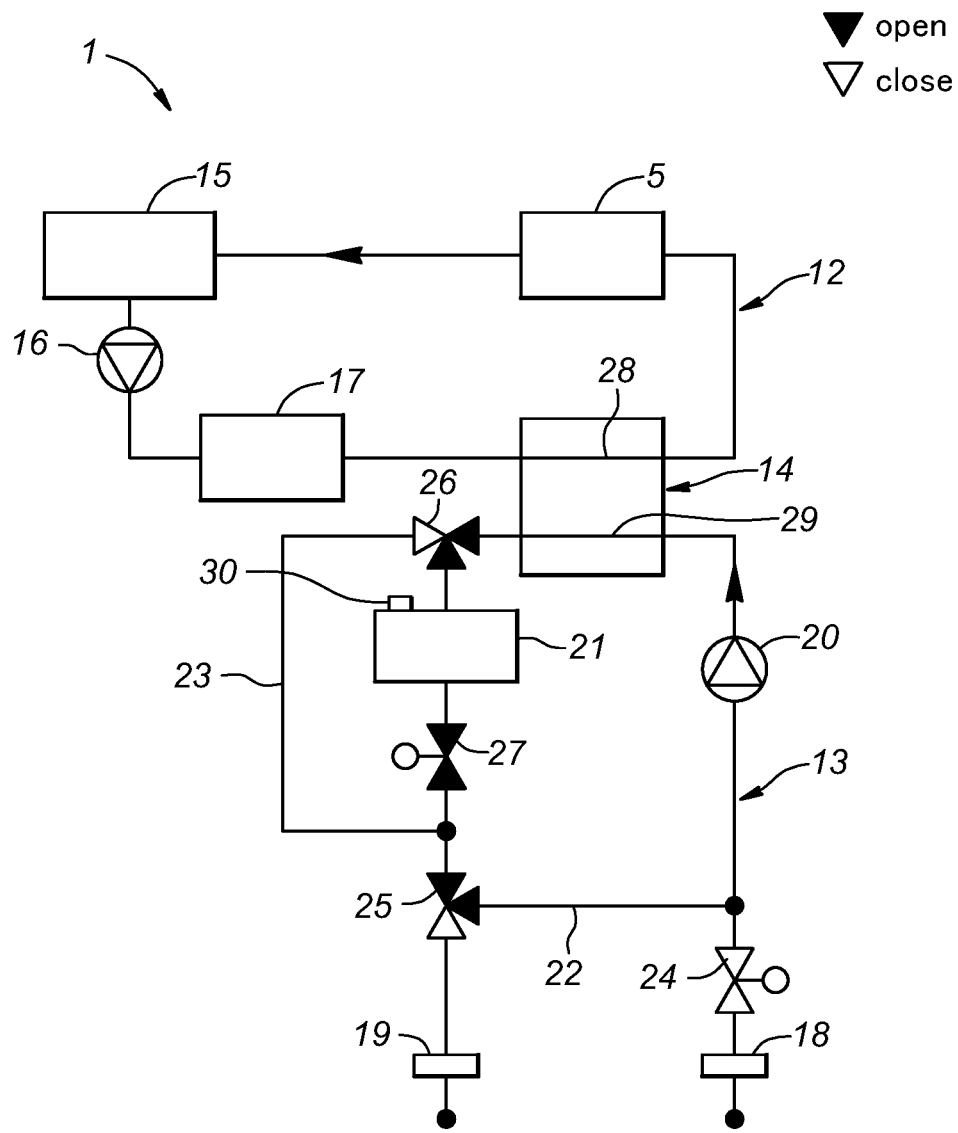
FIG. 5 is a schematic diagram showing part of a cooling system for watercraft according to a modification of the above-described embodiment.

FIG. 5 shows a tank 21 in a watercraft battery cooling system 1 according to a modification of the above-described embodiment. As shown in FIG. 5, the tank 21 may be provided with a water injection port 30 in its upper part. In this case, when the amount of cooling water in the tank 21 is not sufficient or when the cooling water becomes too hot to cool the coolant sufficiently, tap water or water from any other source can be injected into the water injection port 30. When tap water or other fresh water is injected into the tank through the water injection port 30, the first channel switch valve 25 is opened toward the water outlet 19 as necessary in order to partially discharge the hot cooling water.

The operations and effects of the watercraft battery cooling system 1 will be described below in detail.

In the watercraft battery cooling system 1, as the coolant can be cooled by the circulation of the cooling water stored in the tank 21, the battery 5 can be cooled during charging even when a watercraft is on land, where water cannot be taken from an outside water source such as the sea, lake, or river.

The watercraft battery cooling system 1 can be introduced in a watercraft with a relatively low cost compared to configurations in which the battery 5 is cooled by a chiller system. In addition, when a watercraft is on land and the battery is being charged, the battery can be cooled with free water that has been acquired from the outside such as sea, lakes, or rivers, and stored in the tank. Thus, the watercraft battery cooling system 1 can be operated with a relatively low cost compared to using tap water for battery cooling.

In other cases, when the tank 21 is an existing ballast tank that is also used as the tank, the watercraft battery cooling system 1 can be introduced with less worsening inboard layout flexibility in the watercraft body 3.

When the water in the tank 21 is not used, the flow of the cooling water can be directed to the second bypass channel 23 that is arranged to bypass the tank 21, which reduces the energy required for the cooling water pump 20.

Although the watercraft battery cooling system 1 has a relatively simple configuration with the first and second bypass channels 22, 23 and the four valves 24 to 27, the state of the cooling water channel 13 can be switched between a state for using of the outside water (such as sea, lake or river water) to cool the coolant; a state for storing the outside water (such as the sea, lake or river water) in the tank 21; a state for discharging the water in the tank 21; and a state for circulating the water stored in the tank 21 to cool the coolant.

In cases where the tank 21 is provided with the water injection port 30, when the watercraft is on land and the battery 5 is being charged, tap water or other water can be injected as additional cooling water through the water injection port, thereby lowering the temperature of the cooling water.

The control device 9 may determine whether or not the watercraft 2 is moving, and whether or not the battery 5 is charged when on water or land based on information from the land-water determination device 6, the movement detection device 7 and the charge detection device 8, and automatically sets the respective states of the valves 24 to 27 to be appropriate, which provides convenience for users.

Specific embodiments of the present invention are described herein for illustrative purposes. However, the present invention is not limited to those specific embodiments, and various modifications may be made to the embodiments without departing from the scope of the present invention. For example, the watercraft battery cooling system may be configured such that, when a watercraft stops on the water, the battery can be charged by the same charging method as that used when the watercraft is on land.

Glossary

1 cooling system for watercraft
2 watercraft
4 electric propulsion device
5 battery
6 land-water determination device
7 movement detection device
8 charge detection device
9 control device
12 coolant channel
13 cooling water channel
14 heat exchanger
18 water inlet
19 water outlet
21 tank
22 first bypass channel
23 second bypass channel
24 first open-close valve
25 first channel switch valve
26 second channel switch valve
27 second open-close valve
28 primary channel
29 secondary channel
30 water injection port

The invention claimed is:

1. A cooling system for watercraft comprising:
a rechargeable battery capable of powering an electric propulsion device of a watercraft;
a coolant channel through which coolant circulates to cool the battery;
a cooling water channel through which cooling water flows, the cooling water containing seawater or fresh water acquired from outside sources; and
a heat exchanger for exchanging heat between a primary channel and a secondary channel, wherein the primary channel communicates with the coolant channel and allows the coolant to flow therethrough, and wherein the secondary channel communicates with the cooling water channel and allows the cooling water to flow therethrough,
wherein the cooling water channel comprises:
a central water line which communicates with the secondary channel, and includes a water inlet for taking in the cooling water, a water outlet for discharging the cooling water, and a tank for storing the cooling water;
a first bypass channel which communicates with the central water line so as to cause the flow of the cooling water to bypass the water inlet and the water outlet, thereby allowing the cooling water stored in the tank to circulate in the cooling water channel, and
a first bypass valve arrangement which enables a selection of whether or not the cooling water is allowed to flow through the first bypass channel.

2. The cooling system as in claim 1, wherein the first bypass valve arrangement comprises:
a first open-close valve provided in the central water line between the water inlet and a location where one end of the first bypass channel, the end being on the side of the water inlet, is communicatively connected to the central water line, wherein the first open-close valve is configured to open and close, thereby allowing and preventing the flow of the cooling water in the central water line; and
a first channel switch valve provided at a location where the other end of the first bypass channel, the end being on the side of the water outlet, is communicatively connected to the central water line, wherein the first channel switch valve is configured to switchably direct the flow of the cooling water in the central water line between toward the water outlet, and into the first bypass channel.

3. The cooling system as in claim 1, wherein the cooling water channel comprises:

a second bypass channel which communicates with the central water line so as to cause the flow of the cooling water to bypass the tank; and
a second bypass valve arrangement which enables a selection of whether or not the cooling water is allowed to flow through the second bypass channel.

4. The cooling system as in claim 3, wherein the second bypass valve arrangement comprises:
a second channel switch valve provided at a location where one end of the second bypass channel is communicatively connected to the central water line, the location being upstream of the tank in the central water line, wherein the second channel switch valve is configured to switchably direct the flow of the cooling water in the central water line between toward the tank, and into the second bypass channel; and
a second open-close valve provided in the central water line between the tank and a location, the location being downstream of the tank, where the other end of the second bypass channel is communicatively connected to the central water line, wherein the second open-close valve is configured to open and close, thereby allowing and preventing the flow of the cooling water in the central water line.

5. The cooling system as in claim 3, further comprising:
a land-water determination device configured to determine whether the watercraft is on water or on land;
a movement detection device configured to determine whether or not the watercraft is moving;
a charge detection device configured to determine whether or not the battery is being charged;
a control device configured to receive information from the land-water determination device, the movement detection device, and the charge detection device and control the first and second bypass valve arrangements,
wherein the control device controls the first and second bypass valve arrangements such that, when the battery is charged on land, the cooling water flows through the first bypass channel and does not flow through the second bypass channel, and that, when the battery is charged on water and the watercraft is moving on water, the cooling water does not flow through the first bypass channel and flows through the second bypass channel.

6. The cooling system as in claim 1, wherein the tank is provided with a water injection port through which the cooling water can be injected in the tank.

* * * * *